Sept. 22, 1953   H. HAGMEISTER   2,652,749
TOOLHOLDER
Filed Oct. 17, 1951   2 Sheets-Sheet 1
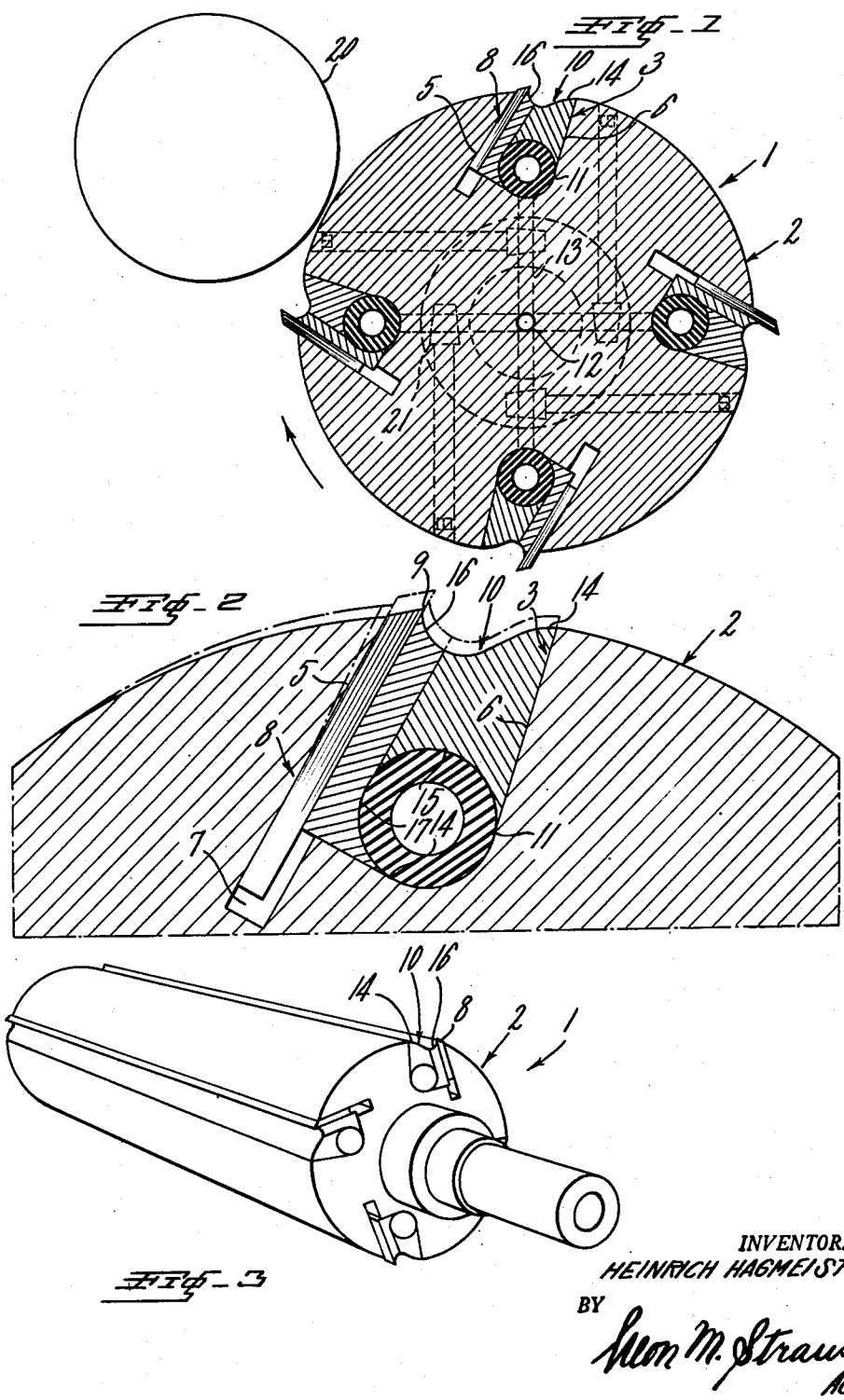
INVENTOR.
HEINRICH HAGMEISTER
BY

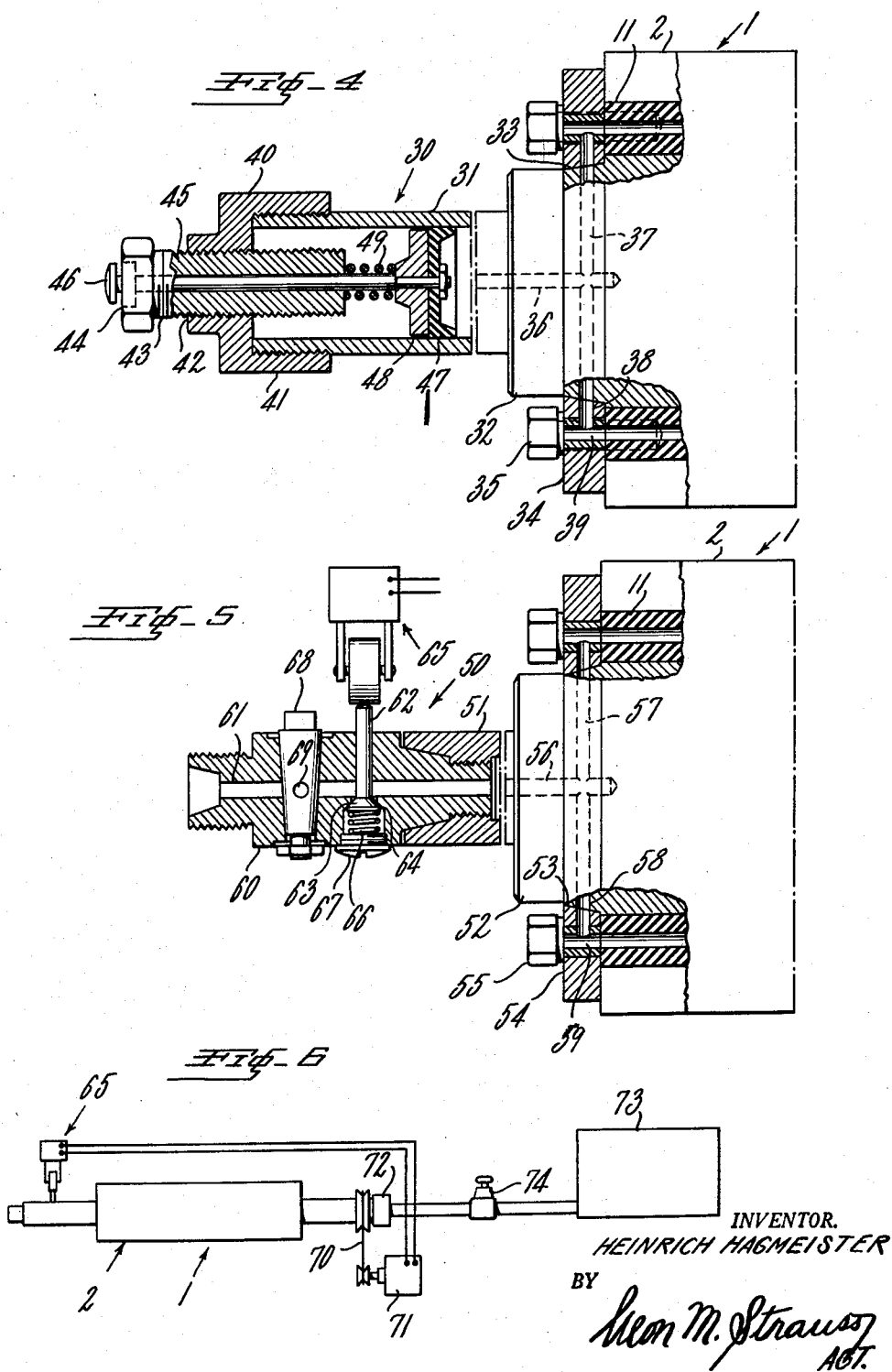

Patented Sept. 22, 1953

2,652,749

UNITED STATES PATENT OFFICE 2,652,749

TOOLHOLDER

Heinrich Hagmeister, Herford, Germany

Application October 17, 1951, Serial No. 251,673

7 Claims. (Cl. 90—11)

This invention relates to supports and more particularly to a pressure actuated device for selectively mounting and securing cutting tools and the like on holder bodies.

An object of this invention is to provide means facilitating the rigid securement of one or more work-engaging tools to a holder body.

Another object of the present invention is to provide pressure responsive means permitting the adjustable support of one or more work-engaging tools on a holder body.

A further object of the present invention is to provide means mounting cutting tools on a holder body in a manner wherein the cutting edges of the tools can be positioned at equally spaced locations from the periphery of the holder body and each singly or simultaneously secured in said location.

A still further object of the present invention is to provide means allowing for the simultaneous securement of one or more cutting tools on a holder body with the cutting edges of the tools each spaced a predetermined distance from the periphery of the holder body.

A still further object of the present invention is to provide pressure responsive means ensuring the clamping of one or more tools on a holder body, the pressure responsive means being adjustable and permitting the work-engaging edges of the tools to be selectively positioned with respect to the periphery of the holder body and subsequently clamped in the selected position.

A still further object of the present invention is to provide means permitting the operating pressure of the aforesaid pressure responsive means to be adjusted in accordance with the rotational speed of the holder body for minimizing the distortion of the holder body due to an excessive distorting force created by the operating pressure of the pressure responsive means and the centrifugal force developed by rotation.

A still further object of the present invention is to provide means permitting the operating pressure of the aforesaid pressure responsive means to be decreased as the rotational speed of the holder body increases, thereby maintaining the aforesaid distorting forces acting upon the holder body within permissible limits.

A still further object of the present invention is to provide means facilitating the automatic stopping of the rotatable holder body when the pressure of the aforesaid pressure responsive means drops below a predetermined minimum value.

A still further object of the present invention is to provide means permitting a rapid determination and adjustment of the pressure of the pressure responsive means whereby said pressure can be selectively adjusted to permit cutting tools to be positioned with respect to the holder body, subsequently clamped into a fixed position with respect to the holder body, and ultimately maintained in said fixed position during a cutting operation without exerting a distorting force on the holder body.

The above and still further objects of the present invention will become apparent upon consulting the following specification taken in conjunction with the drawings, wherein:

Fig. 1 is an end elevational view, with parts broken away, shown in section, and in phantom, of the pressure actuated tool holder of the present invention;

Fig. 2 is an enlarged fragmentary sectional view of a portion of the tool holder of the present invention;

Fig. 3 is a reduced perspective view of the tool holder illustrated in Figs. 1 and 2;

Fig. 4 is a side elevational view, with parts broken away and shown in section, of the pressure actuated tool holder of the present invention illustrated in conjunction with a device for determining the operating pressure of the tool holder;

Fig. 5 is a side elevational view with parts broken away and shown in section of the pressure actuated tool holder of the present invention illustrated in conjunction with a device for limiting the operating pressure within predetermined limits.

Fig. 6 is a diagrammatic view of one embodiment of the tool holder constructed according to the present invention incorporated in the pressure operated device of Fig. 5.

Referring now with particularity to the drawings there is shown in Fig. 1 the tool holder of the present invention, which is generally designated by reference numeral 1. The tool holder 1 comprises a substantially cylindrical holder body 2 which is provided with a plurality of longitudinally extending seats 3 at spaced locations about the periphery thereof.

The seats 3 extend inwardly from the periphery of the holder body 2 and include a floor 4 which is partially rounded and side walls 5, 6 which converge toward each other from the floor 4 toward the periphery of the holder body 2. The portions of the holder body 2 cut away to form the seats 3 are preferably small with respect to the total volume of the holder body 2 to thereby minimize vibration during rotation of the holder body and deformation of the latter.

The floor 4 of each of the seats 3 is undercut contiguous to the walls 5 to form slots 7 extending longitudinally of the holder body 2, one wall of each of the slots 7 being co-planar with and forming an extension of the walls 5 of the respective seats 3.

Disposed within the seats 3 in abutting and confronting relation with respect to the walls 5 thereof are the cutting tools or knives 8, each of which has one end extending into the adjacent slot 7 and has the other end formed with a work-engaging or cutting edge 9 which projects beyond and is spaced from the periphery of the holder body 2.

Each of the cutting tools 8 is slidably mounted in the adjacent one of the seats 3 for selectively adjusting the cutting edge 9 thereof into various positions exteriorly of and spaced from the periphery of the holder body.

Supported within each of the seats 3 and engageable with the adjacent one of the cutting tools 8 are the pressure responsive clamps 10. Each of the clamps includes an expansible pressure body 11 which is mounted within the seat and is shaped complementary to the adjacent curved portions of the floor 4.

As is clearly illustrated in Figs. 1 and 2 each of the pressure bodies comprises a hollow flexible tube fabricated of a rubber or rubber-like material which is adapted to be connected to a source of fluid under pressure 73 (Fig. 6).

The respective pressure bodies 11 are connected to the source of fluid under pressure by means of an axial bore 12 provided in the holder body 2 and radially extending communicating passageways 13. Each of the passageways has one end terminating in communication with the bore 12 and has the other end terminating in communication with the adjacent pressure body 11. Suitable means 14 (Fig. 6), are connected to the source of fluid under pressure for selectively adjusting the pressure thereof. The source of fluid, the axial bore 12, the radially extending passageways 13 and the hollow bores of the respective pressure bodies 11 cooperate to form a closed hydraulic system which is adapted to be completely filled with any suitable fluid, such as glycerine, oil, gas and the like.

Since the entire system is completely filled with the fluid medium, any changes in pressure are immediately transmitted to all of the pressure bodies throughout their lengths. The pressure responsive clamps 10 further include a clamping key 14 which is wedge-shaped in cross-section and is slidably supported within the respective seats 3 in confronting and abutting relation with the walls 6 of the respective seats. Each of the keys has a portion 15 shaped complementary to and engageable about the adjacent portions of the pressure body 11, as clearly illustrated in Figs. 1 and 2.

The converging walls of the clamping key 14 are in substantially parallel relation with respect to the walls 5 and 6 of the seat 3. The clamp 10 further includes a wedge 16 which is interposed between clamping key 14 and the cutting tool 8 and is formed to substantially fill the space between the cutting tool and the clamping key and the pressure body 11. The wedge 16 includes a portion 17 which is shaped complementary to and engageable with the adjacent portions of the pressure body. Accordingly upon expansion of the pressure body 11 in response to an increase in pressure, the clamping key 14 is urged outwardly and moves the key 14 into a clamping position with respect to the tool 8. The respective seats 3 are suitably dimensioned and shaped, whereby upon movement of the clamp 10 into its clamping position, the cutting tool 8 is rigidly secured to the holder body in a selected position with respect to the latter.

It is apparent to one skilled in the art that the pressure of the closed hydraulic system can be decreased to a point wherein the cutting tool can be selectively adjusted and subsequently increased to a value at which the tool is rigidly fixed within the adjacent seat and slot.

It has been experimentally determined that a pressure of approximately three atmospheres permits the cutting edges of the respective tools 8 to be slid or urged into a predetermined position with respect to the periphery of the holder body. Upon adjusting the tools, the pressure is increased to approximately one hundred atmospheres at which pressure the tools are rigidly fixed in their adjusted positions.

During actual working conditions it has been found desirable to decrease the pressure to approximately fifty atmospheres due to an increase in distorting force occasioned by the centrifugal force developed by rotation of the holder body. The distorted position of the clamped knife and holder body has been illustrated in an extreme way by the broken lines of Fig. 2 of the drawings.

Spaced from the periphery of the holder body is an idler roller 20, the periphery of which is selectively engageable with the tools for urging the cutting edges of each of the tools 8 into predetermined equally spaced positions with respect to the periphery of the holder body 2. For adjusting the tools, the pressure in the closed hydraulic system is reduced to approximately three atmospheres and the holder body rotated in the direction of the arrow, Fig. 1, so that the tools are successively engaged by the idler roller 20 and urged into the desired position with respect to the holder body.

By varying the spacing of the periphery of the holder body and the periphery of the idler roller with respect to each other, various tool settings can be obtained. Subsequent to the setting operation the pressure is again increased in accordance with the particular working conditions encountered.

Connected within each of the passageways 13 of the closed hydraulic system are the valves 21 illustrated in phantom in Fig. 1, each of which is individually actuatable exteriorly of the holder body for selectively restricting the passageways or conduits for each of the clamps 10 whereby the individual clamps can be isolated from each other and from the source of fluid under pressure. Accordingly one or more of the seats can be cut off from the source of fluid under pressure thereby permitting removal of the tools and clamps to facilitate the replacement, repair and inspection of the respective tools and clamps.

In Fig. 4 there is illustrated a portion of the pressure actuated tool holder 1 of the present invention on which is supported a device 30 for determining the operating pressure within the closed hydraulic system of the tool holder. The device 30 includes an elongated pressure cylinder 31 which has one end formed into an enlarged head 32 having a tapered portion 33. Circumposed about the tapered portion 33 of the head 32 is a securing collar 34 which is complementary to and engageable with the aforesaid tapered portion.

The securing collar 34 is detachably secured to the adjacent end of the holder body 2 by means of the bolts 35 and mounts the pressure cylinder in axial alignment with the holder body. The head 32 is provided with an axial bore 36 which has one end in communication with the interior of the cylinder 31 and has the other end connected in communication with the respective pressure bodies 11 by means of the radially extending passageways 37 provided in the head 32, the alignable radial passageways 38 provided in the collar 34 and the ports 39 formed in the collar 34 which communicate with and form a continuation of the adjacent ends of the hollow interiors of the respective pressure bodies.

The end of the cylinder 31 remote from the head 32 is open and is constricted by means of cap 40 which includes a threaded sleeve 41 engaging an oppositely threaded exterior portion of the pressure cylinder 31. The cap 40 is provided with a longitudinally extending axial bore 42 which threadingly receives and supports a piston supporting body 43 which has one end terminating interiorly of the pressure cylinder 31 and has the other end thereof terminating exteriorly of the pressure cylinder and provided with a seat 44. Slidably received and supported within the body 43 is the piston 45 which carries the indicator head 46 on one end thereof and a piston head 47 and thrust bearing 48 on the other end thereof.

As clearly shown in Fig. 4 the piston head 47 is conformably received within the cylinder 31 and is movable longitudinally thereof in response to the pressure existing in the closed hydraulic system of the tool holder. Interposed between the thrust bearing 48 and the piston supporting body 43 is a biasing spring 49 which normally urges the piston head 47 toward the supporting head 42, the piston head being movable in the opposite direction under the action of the aforesaid pressure.

From the foregoing it is clear that the position of the indicator head 46 with respect to the adjacent end of the supporting body 43 gives a visual indication of the pressure within the closed hydraulic system. The piston 45 can be suitably marked at spaced intervals along its length to calibrate the same in any convenient pressure measuring units.

Referring now to Fig. 5, there is shown a portion of the pressure actuated tool holder of the present invention on which is supported a device 50 for limiting the operating pressure within predetermined limits. The device 50 includes a cylindrical body 51 which is mounted on the holder body 2 of the tool holder 1 by means of the head 52 having the tapered portion 53 which is engaged by the collar 54, the latter being secured to the holder body by means of the bolts 55.

As is illustrated in Fig. 5 the head 52 and collar 54 have axial bore 56, radially extending passageways 57 and bores 58, 59 for connecting the bore 56 in communication with the hollow interior of the pressure bodies 11 of the tool holder 1. The cylindrical body 51 receives and supports an extension 60 having a longitudinally extending bore 61 provided therein which is alignable with the bore 56 upon securement of the extension 60 to the cylindrical body 51.

Supported transversely of the extension 60 is a safety pin 62 which has one end provided with an enlarged tapered head 63 which is engageable with a seat 64 provided in the extension. The other end of the safety pin projects exteriorly of the extension 60 and selectively engages any suitable switch 65 for interrupting the driving source of the rotatable tool holder.

Supported in engagement with the head 63 of the safety pin 62 is a biasing spring 66 which urges the projecting end of the pin into engagement with the switch 65 for actuating the latter. An adjustment nut 67 engages the spring 66 for varying the tensioning effect of the spring on the safety pin. The nut 67 is adjusted so that the spring 66 has no effect on the safety pin 62 when the pressure in the closed hydraulic system is equal to or greater than the desired operating pressure which has been previously disclosed as being fifty atmospheres.

Upon a decrease in pressure below the desired operating pressure the biasing spring 66 urges the pin 62 into engagement with the switch 65 to interrupt the drive for the tool holder.

Supported transversely of the extension 60 is an overload release valve 68 which can be manually adjusted so that the relief port 69 thereof is alignable with the bore 61 whereby the maximum pressure within the hydraulic system can be controlled. The hydraulic fluid released through the bore 61 of the extension 60 can be returned to the closed hydraulic system by any suitable conduit or coupling, not shown.

In Fig. 6 there is diagrammatically illustrated one possible arrangement of the device constructed according to the present invention in which the tool holder which is driven by a pulley coupling 70 which connects the motor 71 to the drive shaft of the tool holder. A suitable rotatable joint 72 connects the fluid source 73 to the axial bore 12 of the tool holder 1, the connection being made through the pressure control valve 74.

While preferred embodiments of the invention have been shown and herein described, it will be understood that the same are capable of modifications without departure from the general scope and spirit of the invention as defined in the claims.

Having thus described the invention, what is claimed as new and desired to be secured by Letters Patent, is:

1. A tool holder for mounting and holding cutting tools comprising a substantially cylindrical holder body having a recess and adapted to be rotated about a support, at least one cutting tool mounted in said recess of said holder body for slidable adjustment whereby the cutting edge of said tool can be adjusted with respect to the periphery of said holder body, a source of fluid under pressure, pressure responsive clamp means carried within said holder body and engageable with said cutting tool for clamping the latter in predetermined position of adjustment, and conduit means for connecting said source to said clamp means.

2. A tool holder according to claim 1, including means for adjusting the pressure of said source, whereby the force exerted by said clamp means on said cutting tool can be controlled in accordance with the rotational speed of said holder body.

3. A tool holder according to claim 2, including visually observable means connected to said source for measuring the pressure thereof.

4. A device for mounting and holding cutting tools comprising a rotary holder body, drive means operatively connected to said holder body for rotating the latter, said holder body being provided with respective recesses for adjustably supporting said cutting tools therein; a source of fluid under pressure, pressure responsive clamp means in communication with said source and engaging said cutting tools for clamping the latter in predetermined position of adjustment, and switch means actuable in response to dropping of the pressure of said source below a predetermined minimum value for interrupting the drive for said holder body.

5. A device according to claim 4, including manually adjustable relief valve for releasing the pressure of said source when the pressure exceeds a predetermined maximum value.

6. A device for mounting and holding a plurality of cutting tools comprising a holder body rotatable about a support and provided with a plurality of radially spaced longitudinally extending seats each adapted to slidably receive and support one of said tools, a source of fluid under pressure, pressure responsive clamp means supported within each of said seats and adapted to engage the adjacent one of said tools, conduit means for connecting said source to the respective ones of said clamp means to effect clamping of said tools in fixed position within said seats, and valve means for individually restricting the conduit means for each of said clamp means whereby the individual clamp means can be isolated from said source.

7. A tool holder for mounting and securing a tool comprising a substantially cylindrical, rotary holder body provided with at least one seat extending from the periphery of said body into and longitudinally of the latter, an expansible body for receiving fluid under pressure mounted within said seat, said seat being shaped for receiving a tool and for adjusting a part of said tool in position relative to and beyond the periphery of said holder body, clamp means received within said seat and movable therein into a clamping position with respect to said tool in response to the expansion of said pressure body, said seat including a floor portion complementary to and engageable with a portion of said pressure body and further including side walls converging from said floor toward the periphery of said holder body, said floor and said side walls being respectively engageable by said clamp means and said tool, said expansible body comprising a hollow flexible tube for connection with a source for delivering said fluid under pressure.

HEINRICH HAGMEISTER.

References Cited in the file of this patent

UNITED STATES PATENTS

| Number | Name | Date |
|---|---|---|
| 1,021,551 | Nichols | Mar. 26, 1912 |
| 1,034,927 | Oehler | Aug. 6, 1912 |
| 1,153,910 | Harrold | Sept. 21, 1915 |
| 1,208,852 | Sproul | Dec. 19, 1916 |
| 1,216,470 | Lehr | Feb. 20, 1917 |
| 1,611,298 | Wilderson | Dec. 21, 1926 |
| 1,961,129 | De Haas et al. | June 5, 1934 |
| 2,034,277 | Albee | Mar. 17, 1936 |
| 2,209,174 | Sheldrick | July 23, 1940 |
| 2,414,574 | Williams | Jan. 21, 1947 |
| 2,430,843 | Colwell | Nov. 11, 1947 |
| 2,598,933 | Nevin | June 3, 1952 |

FOREIGN PATENTS

| Number | Country | Date |
|---|---|---|
| 133,942 | Great Britain | Dec. 3, 1920 |
| 617,874 | Germany | Mar. 3, 1933 |